US010484503B1

(12) United States Patent
Bragdon

(10) Patent No.: US 10,484,503 B1
(45) Date of Patent: Nov. 19, 2019

(54) REMINDER OPTIONS FOR VIEWED ITEMS

(71) Applicant: Pinterest, Inc., San Francisco, WA (US)

(72) Inventor: Andrew Craig Bragdon, Brentwood, CA (US)

(73) Assignee: Pinterest, Inc., San Francisco, CA (US)

( * ) Notice: Subject to any disclaimer, the term of this patent is extended or adjusted under 35 U.S.C. 154(b) by 265 days.

(21) Appl. No.: 15/455,613

(22) Filed: Mar. 10, 2017

(51) Int. Cl.
*G06F 15/16* (2006.01)
*H04L 29/08* (2006.01)
*H04L 12/58* (2006.01)
*G06Q 30/02* (2012.01)

(52) U.S. Cl.
CPC ....... *H04L 67/327* (2013.01); *G06Q 30/0277* (2013.01); *H04L 51/04* (2013.01); *H04L 67/02* (2013.01); *H04L 67/18* (2013.01); *H04L 67/306* (2013.01)

(58) Field of Classification Search
CPC ....... H04L 67/327; H04L 51/04; H04L 67/02; H04L 67/18; H04L 67/306; G06Q 30/0277
USPC ........................................................ 709/205
See application file for complete search history.

(56) References Cited

U.S. PATENT DOCUMENTS

| 2011/0022458 A1* | 1/2011 | Kassan | G06Q 20/4012 705/14.39 |
| 2014/0316979 A1* | 10/2014 | Williams | G06Q 30/0625 705/39 |
| 2016/0225022 A1* | 8/2016 | Kurapati | G06F 16/958 |

* cited by examiner

*Primary Examiner* — Alan S Chou
(74) *Attorney, Agent, or Firm* — Athorus, PLLC

(57) ABSTRACT

Disclosed are systems and methods for generating reminder options that are presented to a user when a user browses to a content item to view the item and then browses away from the item. For example, a user may be presented with one or more content items, such as images, advertisements, etc., on a display of a user device. The content item, when interacted with by the user, results in the user being provided with an additional content item, such as a webpage, associated with the content item. If the user selects a back button, or other navigation control that results in a request being sent to navigate away from the additional content item and back to the previously presented content items, rather than just presenting the same previously presented content items again, a reminder option may be presented allowing the user to indicate whether the user desires to receive a later reminder about the additional content item and/or the object indicated in the additional content item.

20 Claims, 8 Drawing Sheets

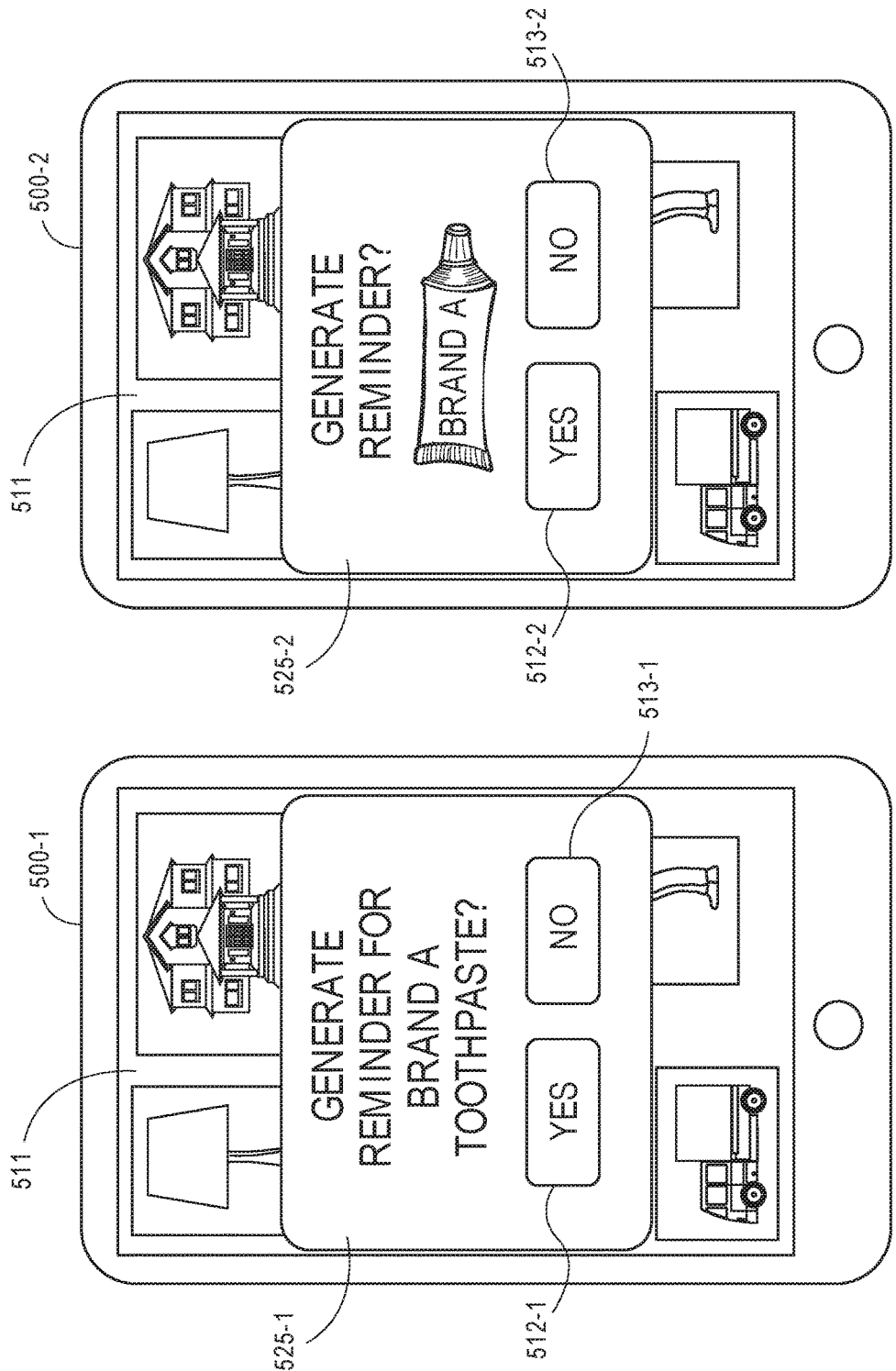

REMINDER OPTIONS FOR VIEWED ITEMS

BACKGROUND

Social media, the Internet, and web pages have changed the way people access information, and how advertisements are presented. In addition, our society has become accustomed to effectively instant gratification and are often not willing to wait for content to load when accessing digital information. For example, users are often only willing to wait one to two seconds after selecting a website for that website to load. If it takes longer for the content to be loaded and presented to the user, the user will often abandon the page, navigating back to the page from which they came and/or browsing other material. In addition, users often perform different modes of browsing while at different locations, on different devices, and/or at different times of day. For example, a user may be in a search mode while browsing on a small display user device, such as a smart phone. When browsing in search mode, users often view numerous different items and/or types of items but rarely purchase or obtain those items. In comparison, when the user is browsing on a larger display user device, such as a laptop or desktop, the user may be browse in a purchase mode. During purchase mode, users may browse to specific items, compare those items with other similar items, and eventually purchase or otherwise obtain one or more of those items.

Drawbacks to different modes of browsing at different times are that users often do not take the time to save, store or otherwise remember the items viewed during a browsing session so they can review and purchase the previously browsed item. For example, a user may view an item on a small display user device during their commute to work, be interested in the item but want to learn more before completing a purchase. However, while their intent may be to view the item later, the user may forget about the item, forget the source of the item, etc. The disjoint between different modes of browsing at different times results in lost revenue opportunities for merchants, wasted time for users, lost revenue for advertisers, etc.

BRIEF DESCRIPTION OF THE DRAWINGS

The detailed description is set forth with reference to the accompanying figures.

FIGS. 5A and 5B are representations of example reminder options presented when a user selects a back button to navigate back to a prior page, in accordance with implementations of the present disclosure.

DETAILED DESCRIPTION

Figure 1:
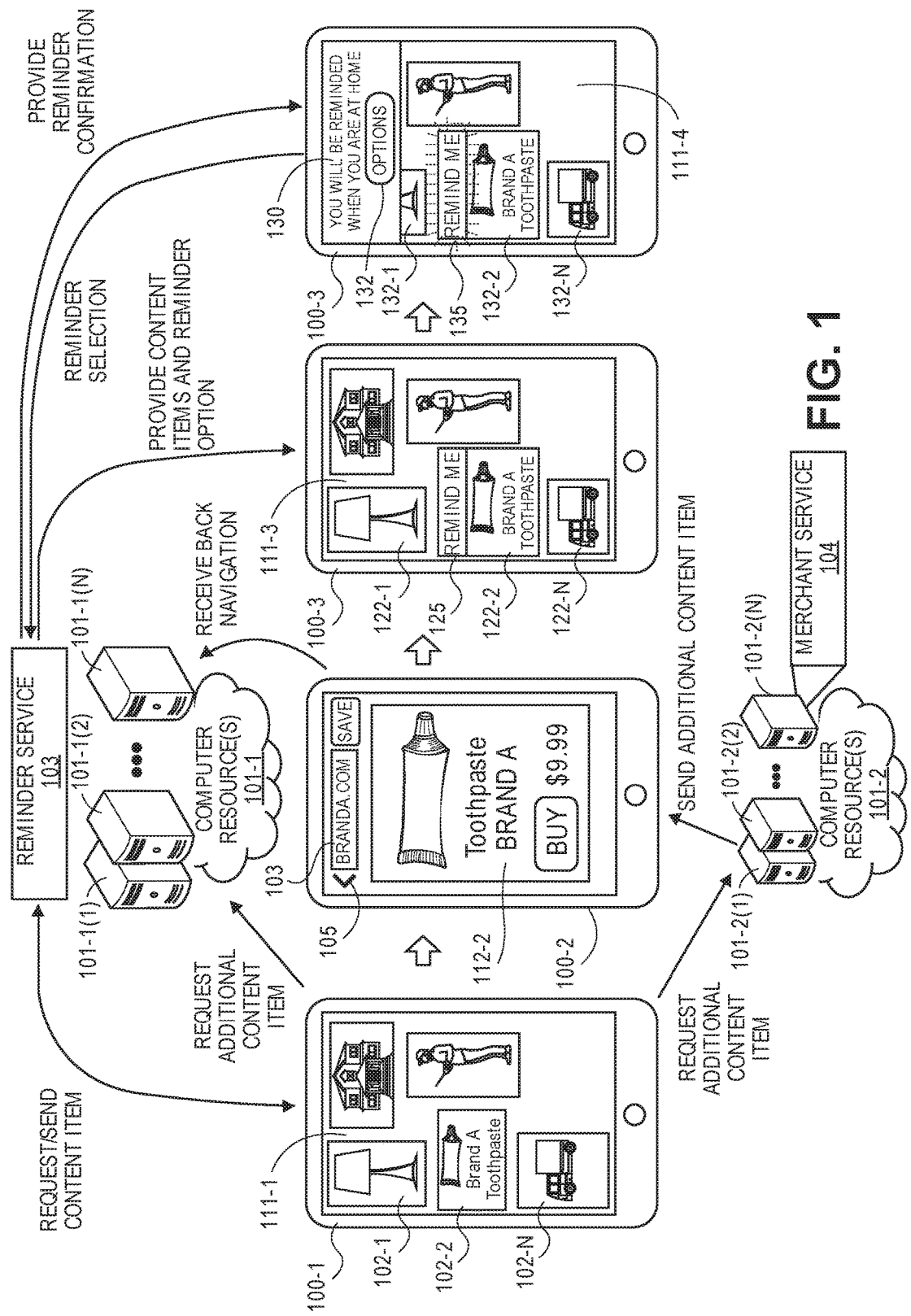
FIG. 1 is a pictorial diagram illustrating an example transition between graphical interfaces illustrating the presentation of a reminder option when a user navigates away from a selected page, in accordance with implementations of the present disclosure.

This disclosure describes systems and methods for generating reminder options that are presented to a user when a user browses to a content item to view the item and then browses away from the item. For example, a user may be presented with one or more content items, such as images, advertisements, etc., on a display of a user device. The content item, when interacted with by the user, results in a request for additional content, such as a web page, associated with the content item being sent to a remote computing resource, the additional content item being received by the user device from the remote computing resource, loaded by the user device, and presented to the user on the display of the user device. When presented with the additional content item, the user may perform many different actions, such as purchase an object associated with the additional content item. However, the user may also select a back button, or other navigation control, that results in a request being sent to navigate away from the additional content item and back to the previously presented content items. In such an instance, rather than just presenting the previously presented content items again, the described implementations may include with the previously presented content items a reminder option. The reminder option may be selected by the user so that at a later point in time, when one or more conditions are satisfied, the user will be reminded of the additional content item, the selected content item, and/or the object represented by the additional content item. When the reminder is sent to the user, the user may interact with the reminder and be presented with the additional content item so that the user can easily resume review of the additional content item and optionally obtain (e.g., purchase, rent, lease, borrow) the object associated with the additional content item.

In some implementations, reminders may be associated with a campaign. For example, the campaign may be an advertising campaign, a marketing campaign, an informational campaign, or a promotional campaign. For a merchant, that provides the additional content items and/or offers the object associated with the content items for sale, lease, rent, etc. For example, merchants may coordinate with a reminder service, discussed further below, that presents content items to users as part of a social network. Rather than or in addition to charging the merchant a fee when the user selects to view a content item associated with the merchant, a fee may be charged when a reminder for a corresponding additional content item is presented to a user, when the user selects to view an additional content item corresponding to a reminder that has been provided to the user, and/or when the user purchases an object from the merchant in response to viewing an additional content item corresponding to a reminder that has been provided to the user. In other implementations, the reminder may correspond to activities or events other than a sale, lease, rent, etc.

For example, the reminder may correspond to a service, a reminder for the user to join a group corresponding to the additional content item and/or the selected content item, a reminder to sign up for a club, credit card, subscription service, etc. In general, the reminder may be any type of reminder related to the selected content item, the additional content item, and/or the object represented in the content item and/or the additional content item.

FIG. 1 is a pictorial diagram of a transition between graphical interfaces illustrating the presentation of content items, additional content items, and a reminder option that is presented when the user navigates away from a presented additional content item, in accordance with implementations of the present disclosure. In this example, the user device 100 is running an application in which content items and/or additional content items are presented on a display of the user device. It will be appreciated that the implementations discussed herein are equally applicable to any combination of applications, user interfaces, operating systems, etc.

At an initial point, the user device 100-1 sends to a first remote computing resource 101-1 a request for one or more content items 102. The first remote computing resource 101-1, upon receipt of the request, provides the requested content items 102 to the user device 100-1, and the user device 100-1 presents the content items 102 on the display of the user device 100-1. The first remote computing resource may include a reminder service 103 that stores the content items, maintains user information, such as user profiles, provides content items and/or additional content items to user devices, maintains content items and/or additional content items, maintains reminders corresponding to users, content items and/or additional content items, determines when conditions corresponding to a reminder are satisfied, and sends reminders for presentation to users. The reminder service 103 is discussed further below.

The first remote computing resources 101-1, and the second remote computing resource 101-2, discussed below, may form a portion of a network-accessible computing platform implemented as a computing infrastructure of processors, storage, software, data access, and other components that is maintained and accessible via a network. Services, such as the reminder service 103 offered by the remote computing resources 101-1 and/or a merchant service 104 offered by the remote computing resources 101-2, do not require that the user have knowledge of the physical location and configuration of the systems that deliver the services. Devices, such as the user device 100, may communicatively couple to the remote computing resources 101-1 and/or 101-2 via a network, which may represent wired technologies (e.g., wires, USB, fiber optic cable, etc.), wireless technologies (e.g., RF, cellular, satellite, Bluetooth, etc.), and/or other connection technologies. The network carries data between the devices 100 and the remote computing resources 101-1, 101-2, the reminder service 103, the merchant service 104, etc. For example, the network may carry data representative of a content item request, the content item, an additional content item request, an additional content item, a reminder option, and/or a reminder, as discussed further below.

As illustrated, the remote computing resources 101-1, 101-2 may include one or more servers, such as servers 101-1(1), 101-1(2), . . . , 101-1(N) of remote computing resource 101-1, and servers 101-2(1), 101-2(2), . . . , 101-2(N). These servers may be arranged in any number of ways, such as server farms, stacks, and the like that are commonly used in data centers. Furthermore, as illustrated below with respect to FIG. 9, the servers may include one or more processors and memory which may store the reminder service 103 and/or the merchant service 104 and execute one or more of the processes or features discussed herein.

The reminder service 103 may be, for example and without limitation, a social networking provider, an electronic commerce provider, etc. For example, when a user opens or executes a social networking application on the user device 100-1, the social network application may send a request to the reminder service 103 and/or the first remote computing resources 101-1 for content items to present to the user. The content items may be selected using any of a variety of techniques. For example, the content items may be associated with the user, of interest to the user, randomly selected, based on a search request of the user, etc. Likewise, any number, size, shape, and/or type of content items 102-1, 102-2 . . . 102-N may be retrieved from the reminder service 103 and/or the first remote computing resource 101-1 and presented by the user device 100. In some implementations, user history, user preferences, etc., may be maintained in an associated user profile by the reminder service 103. Likewise, based on the user device 100 and/or user provided information (e.g., user identifier and password), a user profile corresponding to the user may be selected so that appropriate content items are provided to the user and information about the user is known to the reminder service 103.

In the example illustrated with respect to FIG. 1, the user has requested content items related to home and personal care. The presentation 111-1 of the retrieved content items 102, in this example, includes images, video, and/or advertisements potentially related to home or personal care. Likewise, as discussed further below, some or all of the content items 102 may include links, such as uniform resource locators (URL) to a corresponding additional content item. The links may be stored and accessible from the first remote computing resource 101-1 or from other remote computing resources. For example, the content item 102-1 may include a link to additional content maintained by the first remote computing resource 101-1 and the second content item 102-2 may include a link to a web page (additional content item) of Store A that is maintained and accessible from a second remote computing resource 101-2 that is distinct and independent from the first remote computing resource 101-1.

Additional content items, as used herein, may be any digital content that can be referenced by a link or other data of a content item, requested, and retrieved from a resource that is remote from the user device. For example, an additional content item may be an image, a webpage, a video, etc., that is referenced by a content item and retrievable from a resource that is not the user device.

A user may view and/or interact with any of the content items 102 presented on the display of the user device 100-1. In this example, the user interacts with, by selecting using a touch-based display, the content item 102-2, which is an advertisement for Brand A toothpaste. In response to receiving an interaction from the user, the user device 100-1 sends a notice of the request for the additional content item to the reminder service 103 and requests the additional content item from the second remote computing resource 101-2. Providing a notification to the reminder service and requesting the additional content item from the second remote computing resource may be done in a variety of manners, any of which are contemplated by the disclosed implementations. For example, the link may include a reference to the reminder service 103 and/or the first remote computing resource 101-1 and the request may be initially sent to the first remote computing resource 101-1. The first remote computing resource may receive the request and identify a redirect in the link that will result in the request being redirected to the second remote computing resource 101-2. In another example, the content item may include multiple links that are followed, one of which provides a notification to the first remote computing resource and a second that requests the additional content item from the second remote computing resource.

When the additional content item has been received from the second remote computing resource (or other location), the additional content item is presented to the user on the display of the user device, as illustrated by user device 100-2. In this example, the additional content item referenced by the content item 102-2 is a webpage maintained by the merchant service 104 that is an advertisement and/or offer to sell Brand A toothpaste. The additional content item is requested from the second remote computing resource 101-2 and sent to the user device 100-2. The user device, upon receipt of the web page content (additional content item), loads the web page and, once loaded, presents the additional content item 112-2 on the display of the user device 100-2. The additional content item may also include a presentation of the webpage uniform resource locator (URL) and or a navigation control 105 (e.g., back button) that may be selected by the user of the user device to navigate away from the additional content item and back to the presentation 111-1 of the content items previously presented on the display of the user device 100.

In this example, rather than a user completing a purchase of the object (toothpaste) represented by the additional content item, the user interacts with the navigation control 105 to navigate away from the presentation of the additional content item 112-2 and back to the presentation 111-1 of the content items previously presented by the user device 100. When a user interacts with a navigation control to navigate back to a prior content item (e.g., prior webpage), the back navigation request is transmitted from the user device 100-2 to the computing resource 101-1 and/or the reminder service 103. The reminder service, upon receiving the navigation command, rather than presenting the presentation 111-1 with the original content items provides for presentation by the user device 100-3 a presentation 111-3 that includes the originally presented content items 122-1, 122-2 . . . 122-N and a reminder option 125. The reminder option 125 may be presented adjacent the previously selected content item 122-2 to provide an option for the user to select to be later reminded about the content item, the additional content item 112-2, and/or the object corresponding to the content item and/or the additional content item.

The reminder option 125 is a selectable control or button that may be selected by the user to indicate to the reminder service 103 that the user desires to receive a reminder at a subsequent time about the content item, additional content item, and/or the object represented by the content item and/or additional content item. In some implementations, a user may specify preferences for the type of reminder or reminders that are to be provided to the user and such information may be maintained by the reminder service 103 in a user profile associated with the user. For example, the user may specify that reminders are to be provided as electronic mail messages, pop-up messages, text messages, multimedia messages, telephone calls, etc.

In addition to specifying a type of the reminder(s) that is to be sent to the user, the user may also specify one or more conditions that are to be satisfied before a reminder is sent to the user. For example, a user may specify that reminders for items are to be sent to the user based on the user location, the time of day, the type of device utilized by the user, etc. In some implementations, a user may specify that reminders for items viewed while on a user device with a small display in which a reminder option was selected are only to be sent to the user when the user is operating on a large display user device. As another example, a user may specify that reminders are only to be sent when the user is physically at a particular location (e.g., home) and/or during a particular time of day (e.g., after 17:00 hours).

Returning to FIG. 1, if the user selects the reminder option 135, a reminder notification is sent from the user device 100-3 to the reminder service 103. The reminder notification may include the link included in the content item, a user identifier of the user, and/or other information. In other implementations, the reminder notification may only include an indication of the content item selected by the user. The reminder service may maintain information as to the user and the additional content item corresponding to the content item.

Upon receiving the reminder notification, the reminder service stores the reminder notification and one or more conditions that must be satisfied before a reminder is sent to the user. The conditions include, but are not limited to, a time duration, a location of the user device, a location of the user, a time of day, an activity associated with the user profile, a type of user device used by the user associated with the user profile, etc.

A reminder conformation 130 may also be generated and presented by the user device 100-3 to confirm to the user that the requested reminder has been received. The reminder confirmation may be presented in a variety of manners. For example, as illustrated in FIG. 1, the reminder confirmation 135 may be temporarily presented on the display of the user device 100-3 as a drop-down notification that appears as part of the presentation 111-4 with or over the content items 132. In other implementations, the reminder confirmation 135 may be a pop-up notification, or other form of indicator. In the illustrated example, the reminder confirmation 135 is temporarily presented over the content item 132-1 and concurrently as part of the presentation 111-4 of the other content items 132-2-132-N.

In some implementations, the reminder confirmation 130 may also include an Options controls 132 that is selectable by the user to enable the user to provide preferences or options corresponding to the reminder. Example options include, but are not limited to, the frequency and/or type of reminder to be provided, location preferences for generation of the reminder, criteria to be satisfied for reminder generation (e.g., time of day, day of week, location, device type, access type), whether user information may be provided to a merchant corresponding to the content item, additional content item, and/or represented object, and/or other user preferences.

While this example indicates that the reminder notification and one or more conditions are maintained by the user device, in other implementations, a reminder may be generated and stored by the reminder service 103 with the one or more conditions. Likewise, in some implementations, different types of reminders may be utilized to remind a user about a content item, additional content item, and/or an object represented by a content item and/or additional content item. Different types of reminders include, but are not limited to, pop-up messages, text messages, multimedia messages, electronic mail messages, audio messages, telephone messages, physical objects (e.g., mail catalogs, samples), etc.

Different types of reminders may be generated and sent to a user based on, for example, user preference and/or based on the satisfied condition. For example, a user may specify the types of reminders the user desires to receive and the reminder service may generate and provide one or more types of preferred reminders based on the satisfied condition and/or based on other conditions associated with the user. For example, if the user indicates they prefer to receive reminders in the form of either electronic mail messages or audio messages, when a condition is satisfied, the type of device currently in-use by the user may be determined and an appropriate reminder type generated and sent based on the type of device in use by the user. For example, if, when the condition is satisfied, it is determined that the user is operating on a large screen device that does not include an audio output, the generated reminder may be in the form of an electronic mail message. In comparison, if it is determined that the user is operating on a small display or non-display device when the condition is satisfied, a reminder in the form of an audio based reminder may be generated and sent to the user. A reminder may be sent to any device upon which the user is operating so that the device can present the reminder to the user.

With the implementation described with respect to FIG. 1, a user is provided an efficient and autonomous way to track viewed content items, additional content items, and/or objects so that the user can be reminded of those content items and/or objects at a later time. The described implementation is a significant improvement to existing systems in which the user must attempt to manually remember the content items, additional content items, or objects previously viewed for which the user may later desire to purchase or view again.

Figure 2:
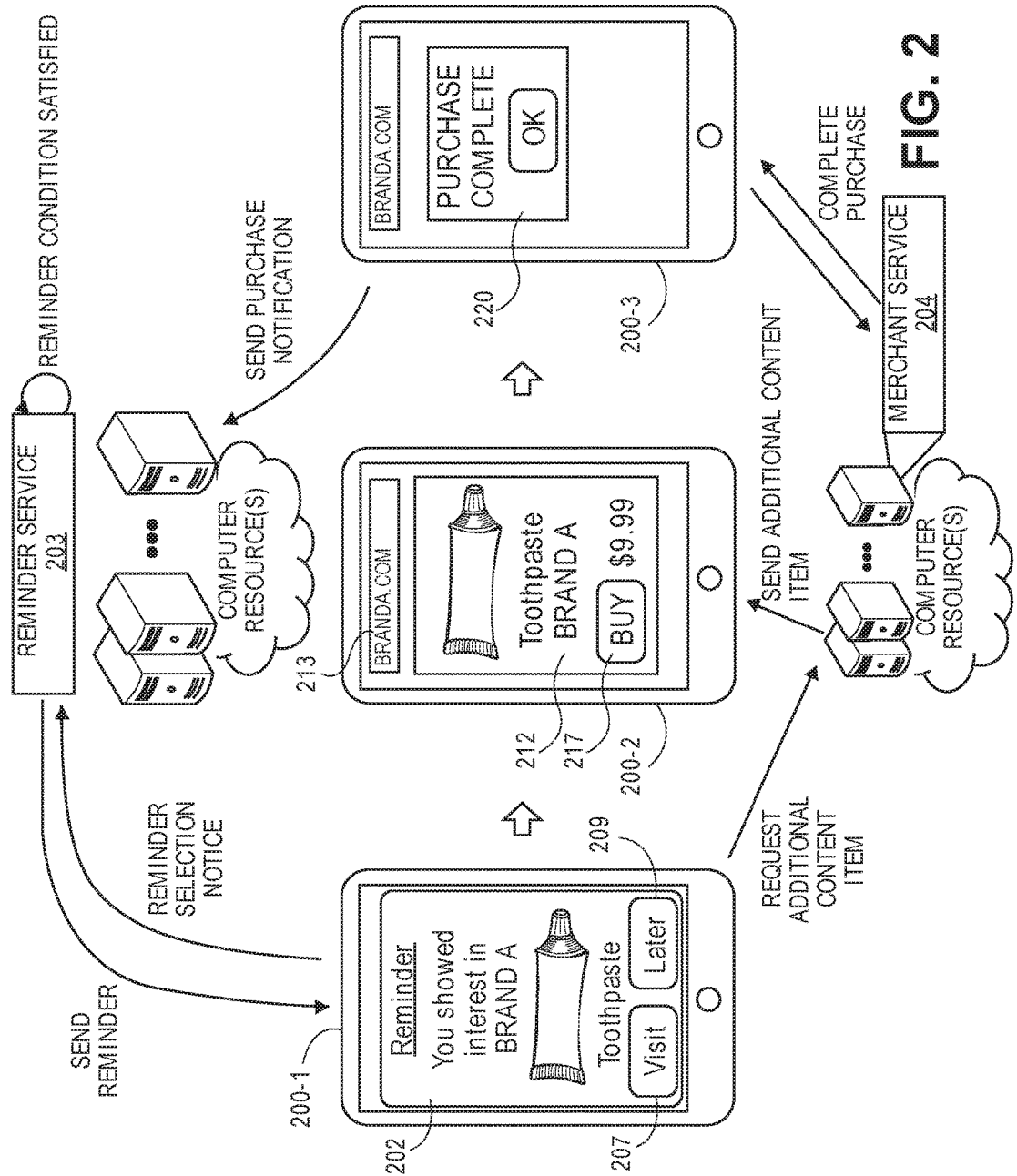
FIG. 2 is a pictorial diagram illustrating an example presentation of a reminder and a subsequent purchase of an object, in accordance with implementations of the present disclosure.

FIG. 2 is a pictorial diagram illustrating an example presentation of a reminder and a subsequent purchase of an object, in accordance with implementations of the present disclosure. As illustrated, subsequent to a reminder being created for a content item or additional content item previously viewed by a user, a determination is made by the reminder service that a condition associated with the reminder has been satisfied. As noted above, the condition may be specified by the user and/or by a merchant associated with the additional content item.

Upon determination that the condition has been satisfied, the reminder for the additional content item is sent from the reminder service 203 to the user device 200-1 for presentation to the user. In this example, the user device 200-1 presents the reminder 202 on a display of the user device 200-1. The user device 200-1 may be the same user device that was used by the user to select the reminder option that caused the generation of the reminder, or the user device 200-1 may be a different user device.

In this illustrated example, the reminder 202 is presented as a pop-up window on the display of the user device and includes information about the reminder, content item, the additional content item, and/or the object represented by the additional content item. In the illustrated example, the reminder includes an indication of the object, in this example Brand A toothpaste, and an indication that it is a reminder that the user previously showed an interest in the object (e.g., the user browsed to an additional content item corresponding to the object). The presented reminder 202 may also include one or more controls, such as a visit control 207, or a later control 209. Other controls may likewise be presented with the reminder, such as a dismiss control or a forget control.

A control may be selected by the user to perform an action associated with the control. For example, if the user selects the visit control 207, as discussed below, the user is presented with the additional content item corresponding to the reminder. If the user selects the later control 209, the reminder may be removed from presentation and presented to the user again at a later time when one or more conditions are again satisfied.

In the example illustrated in FIG. 2, the user selects the visit control 207. Upon selection of the visit control, a reminder selection notice is sent to the reminder service 203 and a request for the additional content item associated with the reminder is sent to the merchant service 204. Similar to the discussion above, the notification sent to the reminder service 203 and the request for the additional content item sent to the merchant service 204 may be performed in a variety of ways, each of which are contemplated by the disclosed implementations. For example, the reminder may include a link that references the reminder service 203 and includes a redirect request to the merchant service 204. Upon selection of the visit control 207, the link may be traversed to the reminder service 203, thereby providing the reminder selection notice to the reminder service, and the reminder service 203 may redirect the request for the additional content item to the merchant service 204. The reminder service, upon receiving the request, may provide the additional content item to the user device. In another example, the reminder may include multiple links and, upon selection of the visit control, a selection notification may be sent to the reminder service via a first link and the request for the additional content item may be sent to the merchant service. In still another example, an application running on the user device may track the actions performed on the presented information, such as the reminder, and provide that information to the reminder service. Accordingly, if the user selects the visit control 207, a request may be sent to the merchant service 204 for the additional content item and the application operating on the user device may detect the selection of the visit control and/or the request for the additional content item and provide the selection notice to the reminder service 203.

The merchant service, upon receipt of a request sent in response to the user selection of the visit control 207, provides to the user device 200-2 the additional content item 212. In this example, the additional content item 212 provided in response to the user selecting the visit control 207 of the reminder 202 is a webpage, as illustrated by the uniform resource locator (URL) 213 for BRANDA.COM. Similar to the additional content item discussed with respect to FIG. 1, the additional content item 212 includes information about an object, in this example Brand A toothpaste that is offered for sale by a merchant. The object may be any physical object, digital object, or service that can be obtained from a merchant and/or the reminder service. The object may be obtained by purchasing the object, leasing the object, renting the object, borrowing the object, or otherwise paying for the object.

A user may interact with the additional content item 212 presented on the user device 200-2 to obtain additional information about the object and/or perform one or more actions with respect to the object. For example, the user may select a buy control 217 to initiate a purchase of the object represented in the additional content item from the merchant service 204.

If the user selects the purchase control, purchase of the object is completed between the merchant service 204 and the user. In addition, a purchase notification may be sent to the reminder service 203 to indicate that the reminder sent and presented to the user resulted in a purchase of the item. In some implementations, an application operating on the user device may detect the purchase of the item from the merchant and provide the notification to the reminder service. In other implementations, the merchant service may provide the purchase notification to the reminder service 203.

The reminder service 203, upon receiving the purchase notification, may remove the reminder so that the user is not again later sent another reminder for the additional content item. Likewise, in some implementations, the reminder service may charge the merchant an advertisement fee for providing the reminder for the additional content item that resulted in the purchase of the item by the user from the merchant. In other implementations, a fee may be charged to the merchant service upon generation and sending of the reminder for the additional content it sent for presentation to the user. Charging advertising fees to merchants for the described reminder service is discussed in further detail below.

Figure 3:
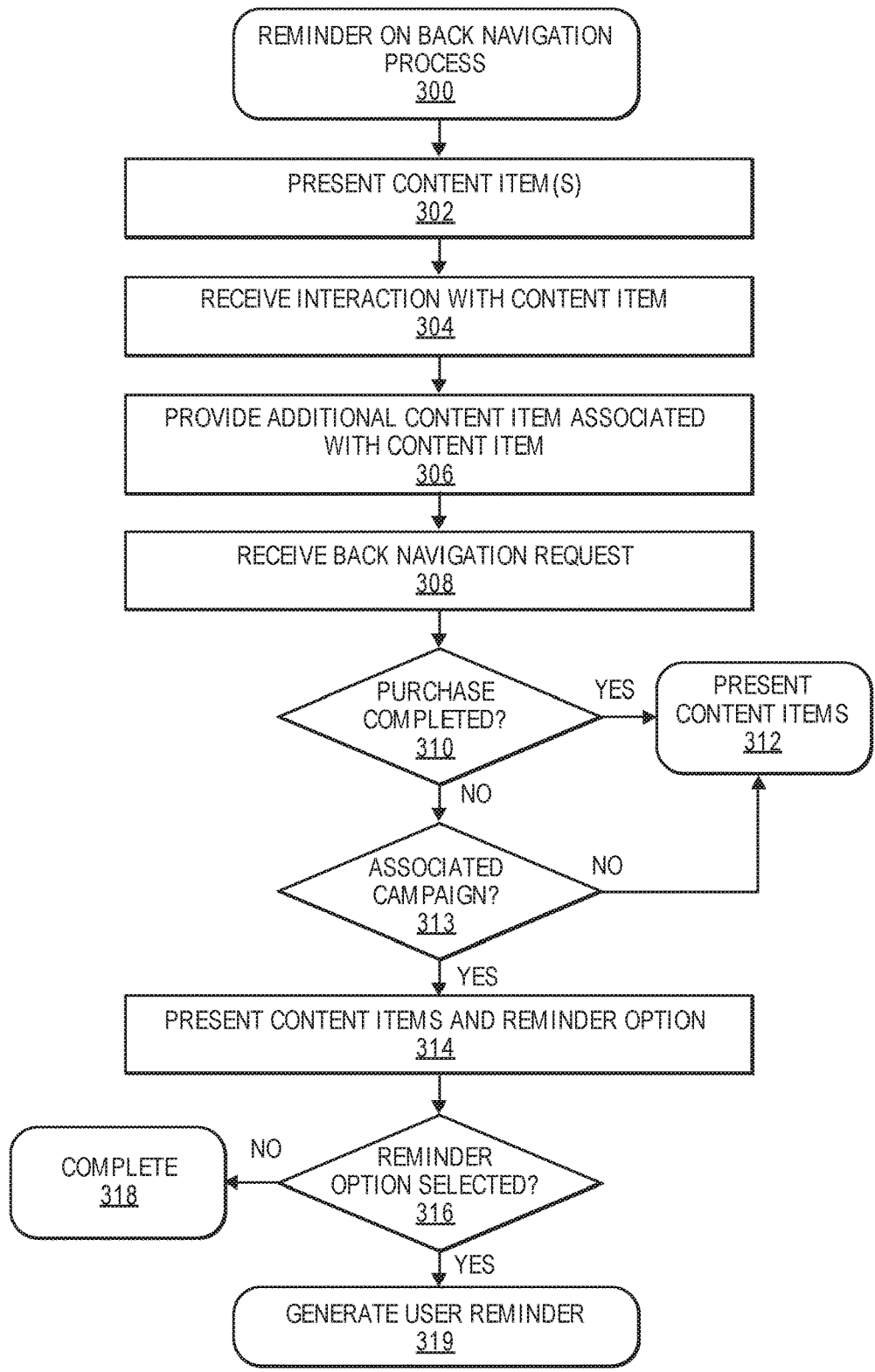
FIG. 3 is a flow diagram illustrating an example reminder on back navigation process, in accordance with implementations of the present disclosure.

FIG. 3 is a flow diagram illustrating an example reminder on back navigation process, in accordance with implementations of the present disclosure. The example process 300 begins upon presentation of one or more content items on a user device to a user, as in 302. As discussed above, the user device may request content items, for example upon initiation of an application executing on the user device, from a remote computing resource and present those content items on a display of the user device. In another example, the content items may be stored in a memory of the user device, retrieved from memory and presented on the display of the user device.

Subsequent to presentation of the one or more content items, an interaction with one of the content items is received, as in 304. Interaction may be received from a user via any type of input device of the user device. For example, if the user device includes a touch-based display, the interaction may be received as a touch from the user on the touch-based display. In another example, the user device may include an imaging component that obtains images of the user and the images may be processed to determine a gaze direction of the user. Based on the gaze direction and duration, it may be determined whether an interaction has been received. In other examples, other forms of input may be received as the interaction with a presented content item.

In response to receiving the interaction, an additional content item associated with the interacted with content item is provided to the user, as in 306. For example, the content item may be associated with a URL or other form of link. The link may be traversed and the additional content item corresponding to the link may be provided to the user device. The additional content item may be any type of item that can be presented by the user device. For example, the additional content item may be a webpage, an image, a video, audio, etc. In some examples, the content item may be an advertisement for a product or service and/or a webpage that offers a product or service for sale, lease, borrowing, etc. In addition, the additional content item may be provided by the example process 300, or a computing resource executing the example process 300. Alternatively, the additional content item may be provided by a resource that is independent of the example process 300 and/or a computing resource executing the example process 300.

Subsequent to providing the additional content item, a back navigation request or notification is received by the example process 300, as in 308. For example, if the user is presented with the additional content item in an Internet browser application, the user may select the back control to navigate away from the additional content item and back to the one or more previously presented one or more content items (presented at block 302). The back navigation request may be received by the example process 300, or a computing resource executing the example process 300, directly from the user device (or an application executing on the user device) and/or from another computing resource that provided the additional content item to the user device.

In response to receiving the back navigation request, rather than providing the previously presented one or more content items, as is typically done in response to a back navigation request, a determination is made as to whether an item presented with or otherwise associated with the provided additional content item was purchased by the user prior to receipt of the back navigation request, as in 310. If it is determined that a purchase was completed, the previously presented one or more content items are sent to the user device and presented by the user device, as in 312. In some implementations, determination of whether a purchase was completed may be omitted from the example process 300 and, any time a back navigation request is received by the example process 300, the example process 300 may proceed to decision block 313 and continue, as discussed below.

If it is determined that a purchase was not completed, a determination is made as to whether a campaign, such as an advertising campaign, is associated with the additional content item, as in 313. If it is determined that the content item and/or the additional content item is not included in a campaign, the previously presented one or more content items is provided to the user device and presented by the user device, as in 312.

A campaign may be any form of advertising or promotional campaign. For example, if the content item and/or the additional content item corresponds to a product or service that is offered for sale, lease, rent, borrow, etc., it may be determined that the additional content item is associated with a campaign. In other examples, a merchant that is providing the additional content item may pay a fee to include one or more content items and/or additional content items in a campaign. In such an example, if the merchant is paying a fee to include the interacted with content item and/or the additional content item in the campaign, it may be determined that the additional content item is included in the campaign. In still another example, the decision block 313 may be omitted from the example process and the example process may proceed to block 314 and continue, as discussed below.

If it is determined that the content item and/or the additional content item is included in a campaign, a reminder option corresponding to the additional content item is provided to the user device and presented to the user device in response to the back navigation request, as in 314. The reminder option may be presented as, for example, a pop-up reminder option, an image, and/or any other form of visual, audible, and/or tactile reminder. In some examples, the reminder option may be presented alone or, in other implementations, the reminder option may be presented in conjunction with the one or more content items previously presented to the user. For example, in the example illustrated and discussed with respect to FIG. 1, the reminder option 125 is presented in conjunction with the one or more content items 122 in response to receipt of a back navigation request. In the example illustrated in FIG. 1, the reminder option is presented adjacent to the content item associated with the viewed additional content item, thereby providing a user context as to what the reminder will relate. As another example, FIG. 5A illustrates a reminder option 525-1 presented as a pop-up window that is displayed as overlaid on top of the one or more content items 511 on the display of the user device 500-1. In the example presented with respect to FIG. 5A, the reminder may be presented in textual form and provide an indication of the item for which the reminder will be created, in this example Brand A toothpaste.

In the examples illustrated in FIG. 1 and FIG. 5A, the reminder option 125, 525-1 may be generated by the example process 300 or a computing resource executing the example process 300 and presented by the user device in response to a back navigation request received from the user device. As still another example, FIG. 5B illustrates a reminder option 525-2 that is curated for the additional content item, or the object advertised by the additional content item. For example, a merchant that provides the content item, the additional content item, and/or the object offered for sale, lease, rent, borrow by the content item and/or additional content item, may provide the example process with a reminder option 525-2 that is specific to the content item, additional content item, or object. In the illustrated example, the reminder option 525-2 is presented as a pop-up window over the one or more content items 511 on the display of the user device 500-2 and is a curated reminder option that includes an image of the object, in this example Brand A toothpaste. Curated reminder options may include additional information relating to the content item, additional content item, and/or object. For example, the reminder option may include an image, such as that illustrated in FIG. 5B, a video, animation, audio, tactile output, etc., to convey information to the user as to the context of the reminder that may be created.

Regardless of the form or presentation of the reminder option that is presented in response to receiving a back navigation request, a user may interact with the presented reminder option and select to generate a reminder. For example, referring again to FIG. 1, the user may provide an input (e.g., touch of the touch-based display) to select the reminder option 125. In FIGS. 5A and 5B the user may select the "Yes" control 512-1, 512-2 to generate a reminder or select the "No" control 513-1, 513-2 to not generate a reminder and have the reminder option 525-1, 525-2 removed from presentation.

Returning to FIG. 3, subsequent to presenting the reminder option, a determination is made as to whether the presented reminder option was selected and a reminder is to be generated, as in 316. If it is determined that a reminder option is not to be generated, the example process completes, as in 318. Completion of the example process 300 may include removing presentation of the reminder option and/or presentation of the one or more content items. If it is determined that the reminder option was selected and a reminder is to be generated, a reminder for the content item, additional content item, and/or an object corresponding to the content item or additional content item is generated and associated with the user profile and/or user device, as in 319. As discussed, a reminder may be any form of reminder that is subsequently provided or otherwise presented to a user to remind the user of the additional content item or object corresponding to the additional content item that was provided to the user before the user selected the back control navigation.

Providing the reminder option for a user to generate a reminder in response to the user selecting the back navigation provides an easy and efficient way for a user to retain information regarding objects and/or additional content items of interest to the user and to remind the user of those additional content items and/or objects at a later point in time. For example, if the user is currently in a search browsing mode to discover objects but is not yet interested in purchasing objects, the described implementations provide an improvement over existing systems by enabling the user to indicate interest in viewed objects and/or additional content items and remind the user about those items/objects at a later point in time. In addition, from a merchant perspective, the described implementations provide an improvement because feedback is received from the user indicating potential interest in the advertised object and/or additional content item, and a subsequent opportunity to remind the user of the user's interest in that object and/or additional content item. As such, conversions (e.g., sales) may be increased. Finally, the disclosed systems provide an improvement for advertising in that advertisements may be more accurately directed to users that are interested in the objects and/or additional content items because the user has already indicated an interest in the object and/or additional content item.

Figure 4:
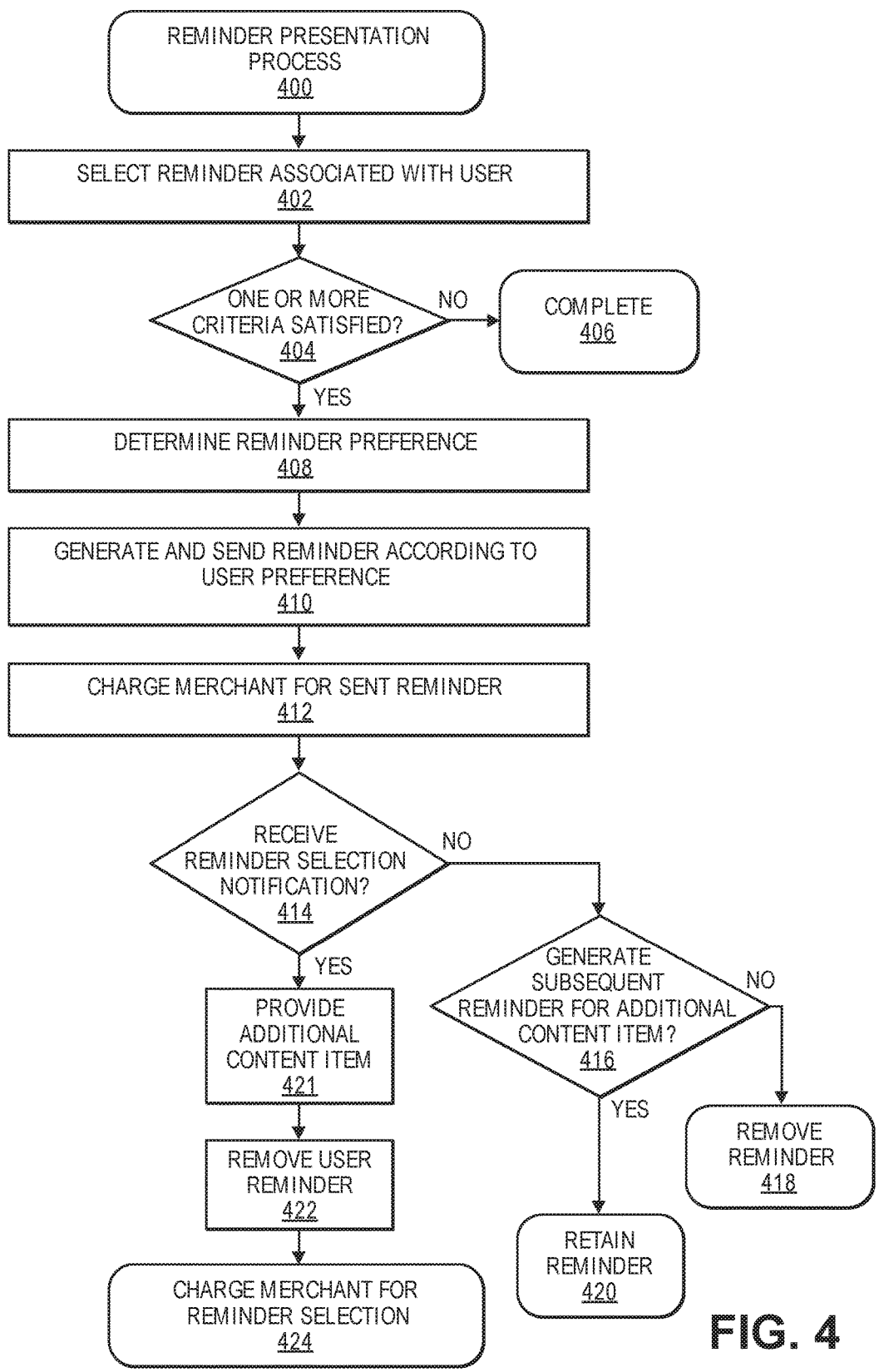
FIG. 4 is a flow diagram illustrating an example user reminder presentation process, in accordance with implementations of the present disclosure.

FIG. 4 is a flow diagram illustrating an example user reminder presentation process 400, in accordance with implementations of the present disclosure. The example process 400 begins by selecting a reminder that was generated as part of the example process 300 and associated with a user profile, as in 402. Upon selection of a reminder associated with a user profile, a determination is made as to whether one or more conditions associated with the user profile and/or the reminder are satisfied, as in 404. Conditions may be specified by the user, a merchant corresponding to the additional content item or object to which the reminder corresponds, etc. Conditions may include, for example, a duration of time since the reminder was generated, a duration of time since the user viewed the additional content item corresponding to the reminder, a location of the user and/or a user device associated with the user, an access by the user and/or by a user device associated with the user, a specified time and/or day, third party data relating to the user, activity of the user, etc.

If it is determined that the one or more conditions are not satisfied, the example process 400 completes, as in 406. If it is determined that the one or more conditions are satisfied, a user reminder preference associated with the user profile is determined, as in 408. A user reminder preference may be specified by a user indicating a preferred mode for receiving reminders. For example, a user may specify that the reminder is to be provided as a text message, a multimedia message, an audio message, an electronic mail message, a telephone call, a physical item delivery (e.g., sample, mail, catalog), etc. In some examples, rather than or in addition to the user specifying reminder preferences, the merchant associated with the reminder, the additional content item and/or the object corresponding to the reminder, may provide one or more preferred modes of providing reminders to users corresponding to the additional content item and/or object. In instances in which both the user and the merchant provide reminder preferences, the example process 400 may determine which type of reminder, if any, is preferred by both the user and the merchant. If there is no mode that is preferred by the user and the merchant, the reminder may not be generated, may be generated to correspond to a user preferred reminder preference, or otherwise generated.

In some examples, rather than or in addition to receiving reminder preferences from the user and/or the merchant, the example process 400 may determine one or more user preferred reminder preferences based on historical activities of the user. For example, the example process 400 may determine based on historical information about the user which types of reminder preferences sent to the user result in the user most frequently viewing the additional content item or acquiring the object. Based on that information, the user reminder preference may be determined as the type of reminder that most frequently results in the user selecting to view the additional content item and/or acquire the object.

Figure 6B:
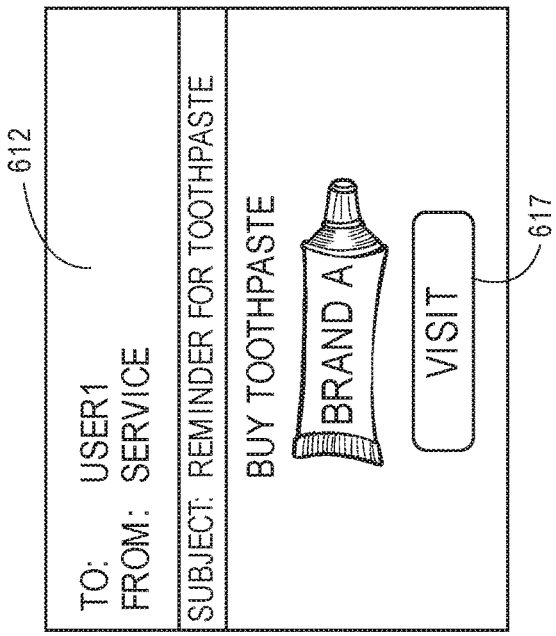
FIGS. 6A and 6B are representations of example reminders presented to a user, in accordance with implementations of the present disclosure.
Figure 6A:
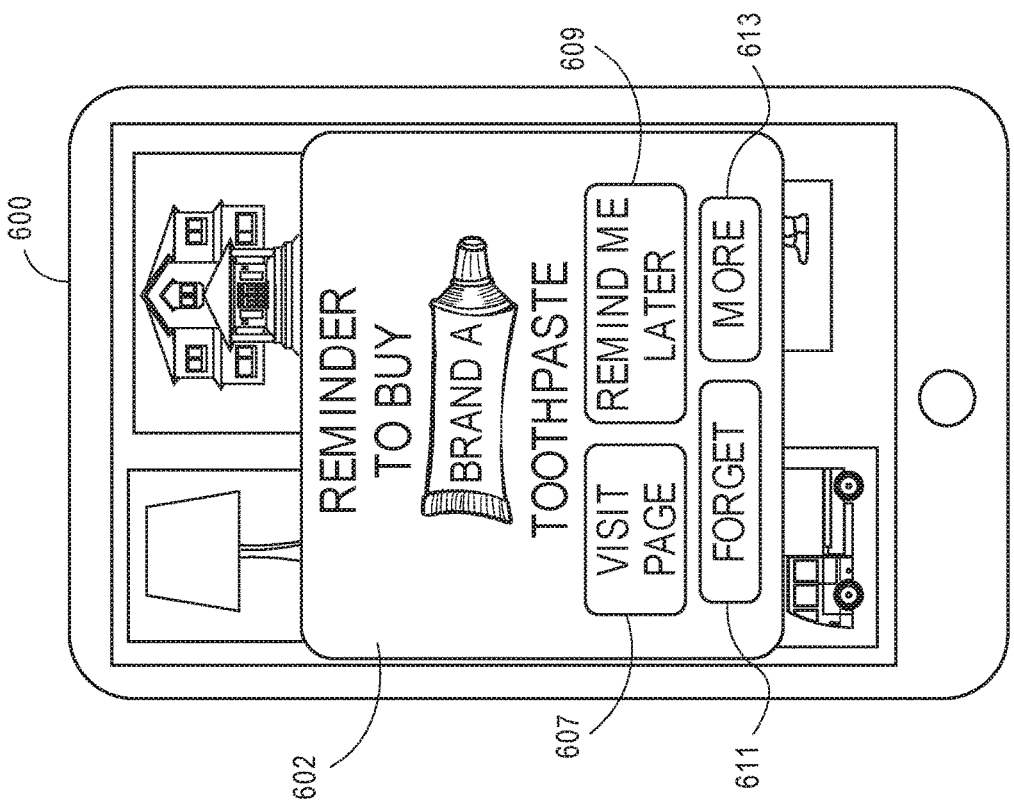

Based on the reminder preference, a reminder is generated and sent for presentation to the user, as in 410. Depending on the type of reminder, it may be sent directly to a user device for presentation to the user (e.g., as a text message, short message, multimedia message), sent for user presentation as an electronic mail message, or otherwise provided for presentation to the user. For example, referring again to FIG. 2, the reminder 202 is sent to the user device 200-1 and presented as a pop-up on the display of the user device. FIGS. 6A and 6B provide examples of other types of reminders that may be sent for presentation to a user when one or more conditions are satisfied. For example, FIG. 6A illustrates another example of a pop-up reminder 602 sent to a user device 600 and presented by the display of the user device. FIG. 6B illustrates a reminder generated and sent in the form of an electronic message 612.

In some implementations, the reminder may be curated and/or provided by a merchant associated with the content item and/or the additional content item. Likewise, the merchant may participate in a campaign as discussed herein and, in some implementations, if the reminder is generated and sent, as specified in block 410, a fee may be charged by the merchant for the generated and sent reminder, as in 412.

A generated and sent reminder provides an indication to the user of the additional content item and/or object to which the reminder corresponds, thereby providing the user a reminder that they indicated an interest in the additional content item and/or object. In some implementations, a reminder may be generated based on information provided by a merchant associated with the additional content item and/or the object and/or may be a curated reminder provided by the merchant to the example process 400. For example, the reminder may include an image, video or other information related to the additional content item and/or the object. Likewise, the reminder may include a link or other reference to the additional content item and/or object that may be selected by the user to view the additional content item and/or the object. In some instances, interaction with the reminder will result in the user being provided with the previously viewed additional content item. In other examples, interaction with the reminder may result in other information (e.g., a different additional content item) corresponding to the additional content item and/or the object being provided to the user.

Referring to FIG. 6A, a user may interact with a reminder by selecting, for example, a "Visit Page" control 607, a "Remind Me Later" control 609, a "Forget" control 611, or "More" control 613. FIG. 6B, which illustrates a reminder in the form of an electronic message, includes a visit control 617. In other examples, reminders may provide other forms of interaction that allow a user to select a link or other control that will result in the additional content item, the object, and/or a different additional content item associated therewith to be provided to the user.

If the user selects the "Visit Page" control 607 or the "Visit" control 617, a reminder selection notification is generated and it is determined in the example process 400 that the reminder selection notification has been received, as in 414. The reminder selection notification may be an indication that is sent by the user device, or an application running on the user device in response to the user selecting the Visit Page control, or other indication that the user desires to view the additional content item or other information about the object for which the reminder was generated.

If it is determined that the reminder selection notification has not been received, it is determined whether a subsequent reminder is to be generated for the additional content item, as in 416. For example, if the user selects the "Remind Me Later" control 609 (FIG. 6A), a notification is sent to the example process 400 indicating that another reminder is to be later provided to the user when one or more conditions are again satisfied. If it is determined that a subsequent reminder is not to be provided, the reminder is disassociated with the user profile and the process 400 completes, as in 418. However, if it is determined that a subsequent reminder is to be provided, the reminder is retained, as in 420.

If the user selects the "More" control 613 the user may be provided with reminder related options that may be selected and/or modified by the user. For example, the user may specify criteria for the reminder, the types of reminders to be generated, whether user information may be provided to a merchant and/or other entity associated with the reminder, etc. In some implementations, the user may specify or the system may determine, different types of reminders that are generated and sent to the user when different criteria are satisfied.

Returning to decision block 414, if it is determined that a reminder selection notification has been received indicating that the user has requested to view the additional content item and/or information about the object to which the reminder corresponds, the additional content item or other information referenced by the reminder is provided to the user, as in 421. As will be appreciated, the additional content item or other information referenced by the reminder may be provided by the example process 400 and/or by another entity (e.g., another remote computing resource and/or the merchant associated with the additional content item). For example, the reminder may include a URL to a webpage of the merchant.

In addition, the reminder for the additional content item is disassociated from the user profile because the user has interacted with the reminder to view the additional content item and/or other information associated with the reminder, as in 422.

Finally, in some implementations, a merchant associated with the reminder, additional content item, and/or object may be charged a fee in response to the user selecting to view the additional content item or other information in response to the reminder being presented to the user, as in 424. For example, if the merchant is participating in an advertising campaign, the merchant may have agreed to pay a fee when a user selects to view the additional content item or other information in response to the user being presented with a reminder. The fee referenced in block 424 may be in addition to or as an alternative to the fee discussed above with respect to block 412. Charging a fee to the merchant may be optional.

Figure 7:
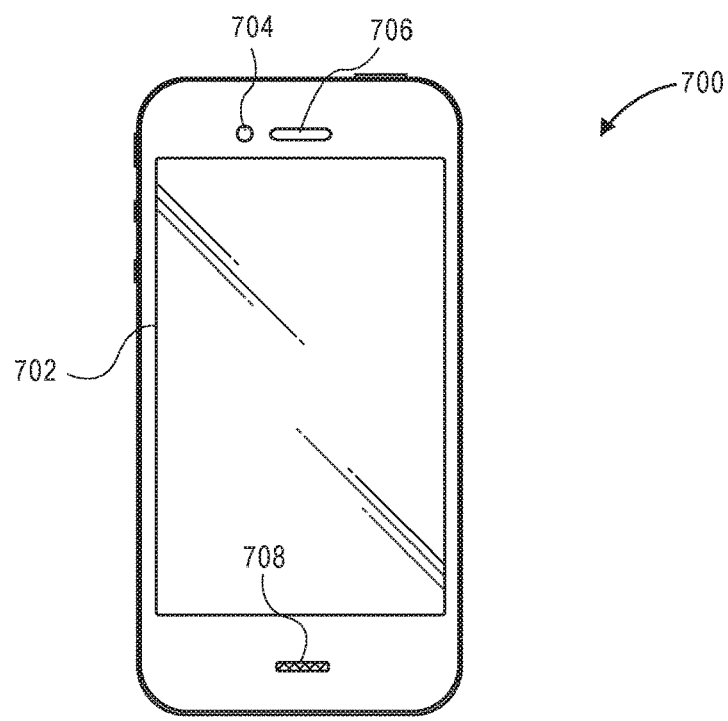
FIG. 7 illustrates an example computing device that can be used in accordance with implementations of the present disclosure.

FIG. 7 illustrates an example user device 700 that can be used in accordance with various implementations described herein. In this example, the user device 700 includes a display 702 and optionally at least one input component 704, such as a camera, on a same side of the device as the display 702. The user device 700 may also include an audio transducer, such as a speaker 706, and optionally a microphone 708. Generally, the user device 700 may have any form of input/output components that allow a user to interact with the user device 700. For example, the various input components for enabling user interaction with the device may include a touch-based display 702 (e.g., resistive, capacitive), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent considering the teachings and suggestions contained herein.

Figure 8:
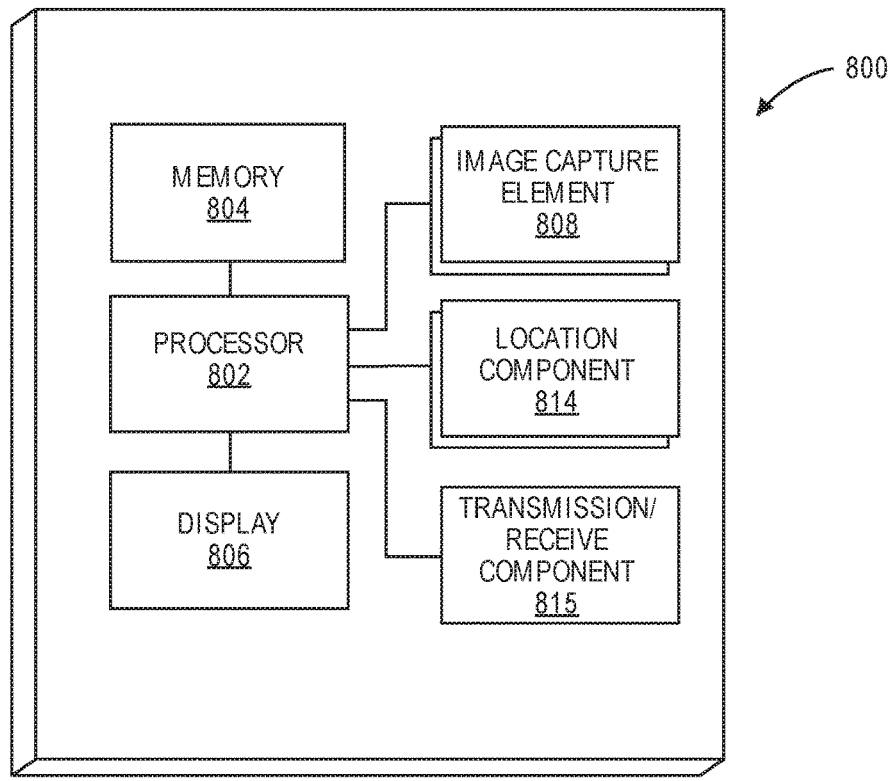
FIG. 8 illustrates an example configuration of components of a computing device, such as that illustrated in FIG. 7.

To provide the various functionality described herein, FIG. 8 illustrates an example set of basic components 800 of a user device 700, such as the user device 700 described with respect to FIG. 7 and discussed herein. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instruction for execution by the processor. Removable storage memory can be available for sharing information with other devices, etc. The device typically will include some type of display 806, such as a touch-based display, organic light emitting diode (OLED) or liquid crystal display (LCD).

As discussed, the device in many implementations will include at least one image capture element 808, such as one or more cameras, that can image objects near the device. An image capture element can include, or be based at least in part upon, any appropriate technology, such as a CCD or CMOS image capture element having a determined resolution, focal range, viewable area, and capture rate.

The device also can include at least one location component 814, such as GPS, NFC location tracking or Wi-Fi location monitoring. Location information obtained by the location component 814 may be used with the various implementations discussed herein to determine the location of the user and/or the user device.

The device will also include at least one transmission/receive component 815, such as a wireless radio for transmitting and/or receiving radio frequency communications. Alternatively, or in addition thereto, the device may be capable of communicating using other forms of wired and/or wireless communication so that the device can send content item requests, additional content item requests, and/or receive content items, reminder options, and/or reminders.

The example user device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations.

Figure 9:
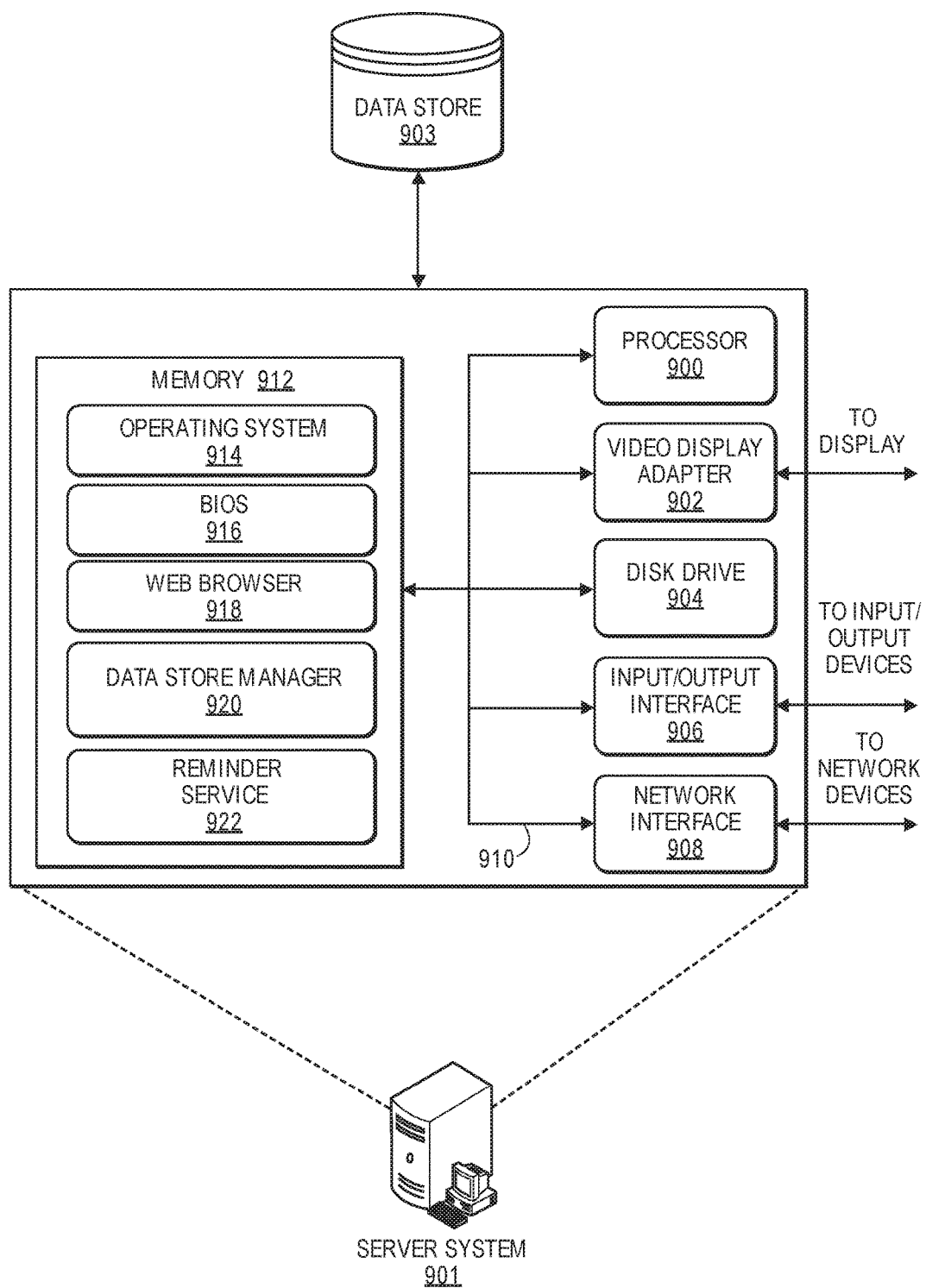
FIG. 9 is a pictorial diagram of an illustrative implementation of a server system that may be used for implementations of the present disclosure.

FIG. 9 is a pictorial diagram of an illustrative implementation of a server system, such as the server system 901, that may be used with the implementations discussed herein. The server system 901 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display permitting an operator of the server system 901 to monitor and configure operation of the server system 901. The input/output interface 906 likewise communicates with external input/output, such as a mouse, keyboard, scanner, or other input and output devices that can be operated by an operator of the server system 901. The network interface 908 includes hardware, software, or any combination thereof, to communicate with other computing devices. For example, the network interface 908 may be configured to provide communications between the server system 901 and other computing devices, such as the user device 700 (FIG. 7).

The memory 912 generally comprises random access memory (RAM), read-only memory (ROM), flash memory, and/or other volatile or permanent memory. The memory 912 is shown storing an operating system 914 for controlling the operation of the server system 901. A binary input/output system (BIOS) 916 for controlling the low-level operation of the server system 901 is also stored in the memory 912.

The memory 912 additionally stores program code and data for providing network services that allow user devices to exchange information and data files, such as content items, additional content items, and reminders with the server system 901 and/or the reminder service 922. Accordingly, the memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange and mapping between the data store 903, and/or one or more user devices, such as the user device 700 shown in FIG. 7.

As used herein, the term "data store" refers to any device or combination of devices capable of storing, accessing and retrieving data, which may include any combination and number of data servers, databases, data storage devices and data storage media, in any standard, distributed or clustered environment. The server system 901 can include any appropriate hardware and/or software for integrating with the data store 903 as needed to execute aspects of one or more of the implementations discussed herein. The server system 901 provides access control services in cooperation with the data store 903 and is able to generate content items, additional content items, and/or reminders, as discussed herein.

The data store 903 can include several separate data tables, databases or other data storage mechanisms and media for storing data relating to a particular aspect. For example, the data store 903 illustrated includes mechanisms for storing content items, user information (e.g., user profiles), additional content items, reminders options, reminders, etc.

It should be understood that there can be many other aspects that may be stored in the data store 903. The data store 903 is operable, through logic associated therewith, to receive instructions from the server system 901 and obtain, update or otherwise process data in response thereto.

The memory 912 may also include the reminder service 922, discussed above. The reminder service 922 may be executable by the processor 900 to implement one or more of the functions of the server system 901. In one implementation, the reminder service 922 may represent instructions embodied in one or more software programs stored in the memory 912. In another implementation, the reminder service 922 can represent hardware, software instructions, or a combination thereof.

The server system 901, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3-4, orders in which such methods or processes are presented are not intended to be construed as any limitation on the claims, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "instantly," or "substantially" as used herein, represent a value, amount, or characteristic close to the stated value, amount, or characteristic that still performs a desired function or achieves a desired result. For example, the terms "about," "approximately," "generally," "nearly," "instantly," or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
presenting on a user device a plurality of images of a corresponding plurality of content items, wherein each of the plurality of images is selectable by a user of the user device;
receiving from the user device a selection of a first image of a corresponding first content item of the plurality of images, wherein upon selection of the first image the user device presents an additional image of an additional content item associated with the first content item;
receiving from the user device a back navigation to navigate away from the additional image back to the plurality of images;
in response to receiving the back navigation, presenting on the user device at least a portion of the plurality of images and a reminder option corresponding to the additional content item;
receiving from the user device a selection of the reminder option;
generating a reminder corresponding to the additional content item;
subsequent to generating the reminder;
 detecting access by the user of a second image;
 determining that the second image includes a representation of the first item of content;
 determining that the one or more conditions associated with the reminder are satisfied by the access of the second image; and
 in response to determining that one or more conditions associated with the reminder are satisfied, sending a reminder for presentation to the user reminding the user about the additional content item.

2. The computer-implemented method of claim 1, further comprising associating the reminder with a user profile of the user.

3. The computer-implemented method of claim 1, wherein the one or more conditions associated with the reminder are specified by at least one of the user or a merchant of the additional content item.

4. The computer-implemented method of claim 1, further comprising:
  subsequent to receiving the back navigation, determining that a purchase of an object corresponding to the first content item was not completed; and
  wherein presenting on the user device at least a portion of the plurality of images and the reminder option corresponding to the additional content item is further in response to determining that the purchase of the object was not completed.

5. The computer-implemented method of claim 1, further comprising:
  in response to receiving from the user device the back navigation, determining that a campaign is associated with at least one of the first content item or the additional content item; and
  wherein presenting on the user device at least a portion of the plurality of images and the reminder option corresponding to the additional content item is further in response to determining that the campaign is associated with at least one of the first content item or the additional content item.

6. The computer-implemented method of claim 5, wherein the campaign is at least one of an advertising campaign, a marketing campaign, an informational campaign, or a promotional campaign.

7. A non-transitory computer-readable storage medium storing instructions, the instructions when executed by a processor causing the processor to at least:
  receive from a user device a selection of a first image representative of a content item presented by the user device, wherein the content item is associated with an additional image representative of an additional content item that is presented by the user device upon selection of the first image;
  subsequent to presentation of the additional image by the user device, receive from the user device a back navigation to navigate back from the additional image;
  in response to receiving the back navigation, send for presentation by the user device a reminder option corresponding to the additional content item;
  receive from the user device a selection of the reminder option;
  associate a reminder corresponding to at least one of the first content item or the additional content item with a user profile;
  subsequent to association of the reminder with the user profile;
    detect access by the user of a second image;
    determine that the second image includes a representation of the first item of content or the additional item of content;
    determine that a condition is satisfied according to the determination that the second image includes the representation of the first item of content or the additional item of content; and
    in response to a determination that the condition is satisfied, send the reminder for presentation to a user reminding the user about at least one of the first content item or the additional content item.

8. The non-transitory computer-readable storage medium of claim 7, wherein the condition is further satisfied by at least one of a time duration, a location of the user device, a location of the user, an activity associated with the user profile, a user preference, or a merchant preference.

9. The non-transitory computer-readable storage medium of claim 7, wherein the reminder is presented as at least one of a pop-up presented on the user device, an electronic mail message sent to an address associated with the user profile, a physical item, a telephone call, a short message, a multimedia message, an audio message, or a text message.

10. The non-transitory computer-readable storage medium of claim 7, wherein at least one of the first content item or the additional content item is a physical object obtainable from a merchant of the physical object.

11. The non-transitory computer-readable storage medium of claim 10, the instructions further causing the processor to at least:
  determine that a request to obtain the physical object from the merchant was not completed prior to receipt of the back navigation; and
  wherein the reminder option corresponding to the first content item is sent to the user device further in response to a determination that the request to obtain the physical object from the merchant was not completed.

12. The non-transitory computer-readable storage medium of claim 10, wherein the additional content item is provided to the user device by the merchant.

13. The non-transitory computer-readable storage medium of claim 10, wherein the additional content item is a web page associated with the merchant.

14. The non-transitory computer-readable storage medium of claim 7, the instructions further causing the processor to at least generate the reminder, wherein the reminder includes a link to the additional content item.

15. The non-transitory computer-readable storage medium of claim 7, the instructions further causing the processor to at least determine a plurality of conditions for the reminder, wherein the condition is included in the plurality of conditions.

16. A method, comprising:
  presenting on a display of a user device, a first image of a first content item, the first image to the first content item including a link to an additional image of an additional content item;
  receiving at the user device, an interaction with the first image;
  obtaining from the link the additional image of the additional content item;
  presenting on the display of the user device, the additional image;
  detecting, at the user device, a back navigation navigating from the additional image and re-presenting the first image;
  in response to the back navigation, presenting on the display a reminder option corresponding to the first image;
  receiving at the user device a selection of the reminder option;
  sending to a remote computing resource a reminder request, the reminder request indicating at least one of the first content item or the additional content item, wherein the remote computing resource generates a reminder for at least one of the first content item or the additional content item;

subsequent to the remote computing resource generating the reminder;

detecting access by the user of a second image;

determining that the second image includes a representation of the first content item or the additional content item;

determining that a condition corresponding to the reminder is satisfied by the access of the second image;

presenting on the display of the user device, the reminder.

17. The method of claim 16, further comprising:

receiving at the user device, an interaction with the reminder;

in response to the interaction with the reminder, obtaining from the link the additional image of the additional content item; and presenting on the display of the user device, the additional image.

18. The method of claim 16, further comprising:

receiving at the user device an interaction with the reminder;

in response to the interaction with the reminder, obtaining from a second link associated with the reminder a second additional image of a second additional content item; and presenting on the display of the user device, the second additional image.

19. The method of claim 18, wherein each of the additional content item and the second additional content item are associated with a merchant that offers an item represented in at least one of the first image, the additional image or the second additional image.

20. The method of claim 16, further comprising:

receiving at the user device, an interaction with the reminder; and in response to receiving the interaction, charging a fee to a merchant associated with the reminder.

* * * * *